Patented Oct. 5, 1948

2,450,594

UNITED STATES PATENT OFFICE 2,450,594

ORGANO-SILOXANES AND METHODS OF PREPARING THEM

James Franklin Hyde, Corning, N. Y., assignor to Corning Glass Works, Corning, N. Y., a corporation of New York No Drawing. Application January 15, 1944, Serial No. 518,371

2 Claims. (Cl. 260—46.5)

This invention relates to new compositions of matter and their preparation and, more particularly, to organo-siloxanes and methods of preparing them.

This application is a continuation-in-part of my copending application Serial Number 432,528 filed February 26, 1942, and assigned to the assignee of the present invention.

Organo-mono-silanes having the general formula RSiXYZ may be prepared by means of the well-known Grignard reaction, where R represents an organic radical which is capable of reacting with magnesium to form Grignard reagents and which is attached to silicon through carbon-silicon linkage and where X, Y and Z represent the same or different readily hydrolyzable radicals such as hydrogen, halogens, alkoxy, aroxy, acyloxy, etc. By hydrolyzable radical is meant, in general, any radical which is attached to silicon by other than carbon-silicon linkage and which under the same set of conditions is more readily hydrolyzed than an organic radical directly attached to silicon through carbon-silicon linkage. Such organo-silanes are hydrolyzed on treatment with water. Concurrent dehydration or condensation with splitting out of water occurs so that a partially dehydrated product results which can be further dehydrated by heat.

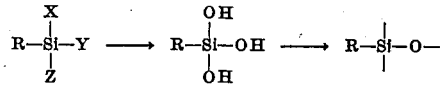

The formation of siloxane linkage, i. e. Si=O results from the close approach of two hydroxyl groups and subsequent elimination of water. It may also result from the close approach of one hydroxyl group to a hydrolyzable group such as halogen, acyloxy, or alkoxy and subsequent elimination of a hydrogen halide, a carboxylic acid or an alcohol respectively. Such eliminations are catalyzed by mineral acids, especially hydrochloric and sulphuric acids, and alkali metal hydroxides, especially sodium hydroxide. It will be seen that in each structural unit one of the four silicon bonds is blocked by the organic radical R, and three siloxane linkages can form. Such compounds are, accordingly, capable of three-dimensional polymerization.

I have found that the properties of the above hydrolysis products depend upon the kind of organic radical which is attached to the silicon. Certain organic radicals possess desirable properties not possessed by others. For example, it is easier to control the hydrolysis and condensation of phenyl silicon trichloride than methylsilicon trichloride, presumably because of the larger size of the phenyl group. Even within a given class of radicals, for example, the alkyls, there is a variation in properties. Accordingly, it is desirable to have different kinds of radicals present in the same product in order to obtain the desired combination of properties. It is also desirable not only to have different kinds of radicals, but also to predetermine the relative proportions of the various radicals in the product. With such compositions, a great variation of properties could be obtained and products could be prepared for specific applications.

An object of this invention is the production of new and useful products which will have desirable predetermined properties.

Another object of this invention is to provide a method of preparing improved mono-organo-siloxanes.

Another object is to provide a mono-organo-siloxane containing at least two chemically different structural units.

A still further object of my invention is to provide a mono-organo-siloxane comprising essentially oxygen atoms and chemically different units having the general formula RSi≡, said units being connected by said oxygen atoms through silicon-oxygen linkages, where R is an organic radical attached to silicon through carbon-silicon linkage.

The new method comprises mixing at least two different mono-silanes of the general formula RSiXYZ, where R represents an organic radical attached to silicon through carbon-silicon linkage and is not the same for the two silanes, and where X, Y and Z are the same or different hydrolyzable radicals attached to silicon by other than carbon-silicon linkages, and causing them to hydrolyze together and become inter-condensed. It is to be understood that each of the silanes is present in appreciable quantity, i. e., in amount sufficient to produce a perceptible effect on the properties of the resulting inter-condensate. One method of accomplishing this inter-condensation is by introducing into the mixture by dropwise addition thereto the amount of water which is calculated for complete hydrolysis of the mixture and which preferably is dissolved in from two to four volumes of a common solvent such as alcohol, ether, dioxan, acetic acid, acetone, etc. Although a difference in the reactivity of the various individual types of hydrolyzable compounds and a variation in the amounts present in the initial mixture may make it desirable to vary the conditions of the process, as will appear from a consideration of the accompanying examples, the above recited procedure in general is to be preferred. The use of a solvent which is completely or partially miscible with water for diluting the hydrolyzable mixture or the water or both and the dropwise addition of the water insures the maintenance of homogeneity during hydrolysis. Under these conditions condensation or the formation of siloxane linkages occurs concurrently with the hydrolysis, but it is to be understood that the extent of further subsequent dehydration is optional and will depend largely upon the use to which the product will be put. Also in order to better control the properties of the resulting product it is desirable to have the starting materials substantially pure, or at least free of other hydrolyzable compounds which tend to produce unwanted co-polymeric combinations.

Hydrolysis of a hydrolyzable mixture of mono-organo-silanes and dehydration of the hydrolysis product will result in inter-condensation or formation of inter-connecting oxygen linkages between the silicon atoms of the mono-organo-substituted silanes. The variety of the substituted organic radicals is limited only by their ability to form a Grignard reagent. The radicals which may thus be substituted may include alkyl radicals such as methyl, ethyl, propyl, isopropyl, butyl, isobutyl, amyl, hexyl, heptyl to octadecyl and higher; alicyclic radicals such as cyclopentyl, cyclohexyl, etc.; aryl and alkaryl radicals such as phenyl, mono- and poly-alkyl phenyls as tolyl, xylyl, mesityl, mono-, di-, and tri-ethyl phenyls, mono-, di-, and tri-propyl phenyls, etc.; naphthyl, mono- and poly-alkyl naphthyls, as methyl naphthyl, diethyl naphthyl, tri-propyl naphthyl, etc.; tetra-hydronaphthyl; anthracyl, etc.; aralkyl such as benzyl, phenylethyl, etc.; alkenyl such as methallyl, allyl, etc. The above radicals may also contain inorganic substituents such as halogens, etc.

If the hydrolyzable groups of all of the silanes in the mixture to be hydrolyzed are halogens, it is preferable to employ dioxan as the solvent because it is inert to the halogens. If the mixture contains both halogens and alkoxy groups the former can be converted to the latter by the slow addition of dry alcohol to the mixture, or the mixture can be diluted with dioxan and treated with aqueous alcohol. When the mixture contains only alkoxy groups any water miscible solvent may be used together with a trace of acid such as hydrochloric acid as catalyst. In this case, alcohol may be preferred on account of its relatively low cost. Mixtures of water miscible solvents may be used.

In the above-described method, the slow incorporation of water into the homogeneous solution insures that hydrolysis is not permitted to proceed unchecked, whereby the more reactive silane or silanes would be more completely hydrolyzed and condensed before the less reactive silanes have had an opportunity to react. On the contrary, the less reactive silanes are thus given a greater opportunity to hydrolyze simultaneously with the more reactive silanes than would be the case if the hydrolysis were conducted rapidly. Under these circumstances, simultaneous condensation of the various intermediate hydroxy compounds takes place and an intimate inter-molecular combination through siloxane linkages of the mono-substituted silicon atoms bearing different organic radicals becomes possible to the fullest extent. This insures a true inter-condensation with the formation of homogeneous products containing mixed unit structures.

The hydrolysis products of the above mixture of mono-organo-substituted silanes exhibit a marked tendency to become gel-like solids owing to their capacity for three-dimensional polymerization. However, this tendency can be controlled to a considerable extent by a proper selection of hydrolysis and condensation conditions. In general, these conditions should be such as will promote only partial hydrolysis and/or partial condensation in order to reduce the effective functionality of the silane. Among the conditions which I have found to be conducive to partial hydrolysis and condensation are the following: a water-miscible solvent as the reaction medium, preferably present in sufficient amount to produce a dilute solution; avoidance of hydrolysis and condensation catalysts such as acids and alkalis; and maintenance of low temperature throughout the reaction. I have also found that better control of the extent of hydrolysis and condensation is had when the hydrolyzable groups of the silanes employed are such as yield non-acidic products upon hydrolysis; for example, the alkoxy groups are desirable in this respect. If, however, halo-silanes are used, then it is advisable to carry out the reaction in a dilute solution, preferably by adding the halide mixture to the water, in order to maintain the acid concentration as low as possible.

The partially condensed hydrolysis products are in general thermoplastic and are useful as molding powders. The thermoplastic products can generally be converted to thermosetting compositions by extended heating at elevated temperatures. As such they are useful as electrically insulating coatings for metallic conductors, impregnants for glass fibers, insulating tape, embedding media for electrical condenser plates, etc.

The organo-siloxanes which can be produced by my method may be represented as combinations of the structural units $RSi\equiv$ bearing in mind that these units are chemically combined with each other by siloxane linkages, that the percentage of each kind of unit may be varied at will, and that the properties of the resulting products will show corresponding variations which can be predicted in making compositions for a particular purpose.

The following examples will illustrate the mode of operation of the process and the character of the resulting products.

Example 1

One gram of dodecylsilicon trichloride and 6.3 grams of phenylsilicon trichloride were added to 10 grams of anhydrous ethyl alcohol. Homogeneity resulted after the addition of 5 grams of "cellosolve" ($C_2H_5OCH_2CH_2OH$). An excess of water was added dropwise. A soft tacky resin remained after solvent removal. On heating for a short time at 265° C., films on glass and metal were still somewhat soft. Further heating caused the films to become very hard. Mixed with pigments the products gave a good high-temperature paint.

Example 2

Eleven grams of anhydrous ethyl alcohol were added to a mixture of one gram dodecylsilicon trichloride and 2.09 grams of phenylsilicon trichloride. After the evolution of HCl had largely stopped 0.36 gram of water (1½ mole per mole of mixed chlorides) were added dropwise with shaking. The resin is liquid while hot after one hour heating at 175° C. On heating for sixteen hours at 265° C. the sample had set. This product with pigments gave good high-temperature paints.

Example 3

One gram of dodecylsilicon trichloride and 5.3 grams of methyltriethoxysilane were dissolved in 10 grams of "cellosolve." 0.15 to 0.20 gram of ethyl alcohol was added dropwise. The solution was heated and 0.9 gram of water was added. After freeing from solvents the resinous product was homogeneous. This indicates that the product is an intercondensate because mixtures of the individual resins per se are not homogeneous. Setting occurred within an hour at 175° C., yielding a very brittle resin.

Example 4

.02 mole of methyltriethoxysilane and 0.02 mole of phenylsilicon trichloride were mixed. Five grams of anhydrous ethyl alcohol were added and the mixture heated until the evolution of HCl had become inappreciable. Twice the amount of water theoretically required for complete hydrolysis was added dropwise, "cellosolve" was then added; the mixture was heated to boiling for fifteen minutes. A soft resin was obtained on driving off the solvents. After one hour heating at 190° C., a stable hard film remained.

Example 5

Methyltriethoxysilane and phenylsilicon trichloride were mixed in the molar ratio of 1:3. Five grams of anhydrous ethyl alcohol were added and the mixture heated until the evolution of HCl had become inappreciable. Twice the amount of water theoretically required for complete hydrolysis was added dropwise; "cellosolve" was then added. The mixture was heated to boiling for fifteen minutes. The product was a somewhat soft resin; it became very brittle on heating one hour at 180° C.

Example 6

To a solution of $C_6H_5CH_2CH_2SiCl_3$ and $(CH_3)Si(OC_2H_5)_3$ in equimolecular proportions was added slowly 95% ethyl alcohol to effect hydrolysis and inter-condensation. Water was then added in slight excess of that calculated to be required for complete hydrolysis. After boiling off the solvents, the concentrated viscous oil was applied to a glass plate and heated over a hot plate at 190° C. In two hours the product had set to a hard and slightly brittle film. The brittleness increased somewhat upon heating an additional twenty hours.

Example 7

A solution of $C_6H_5CH_2SiCl_3$ and $C_{12}H_{25}SiCl_3$ in the molar proportions 2:1 was diluted with approximately twice its volume of dioxan and then hydrolyzed and inter-condensed by the slow additions of a 1:3 solution of water in dioxan. After removing the solvent, the concentrated liquid was applied to a glass plate. Upon heating at 190° C. for two hours, a hard and somewhat brittle thermosetting resinous film was obtained.

Example 8

A solution of $C_6H_5SiCl_3$ and $C_{12}H_{25}SiCl_3$ in the molar proportions of 2:1 was diluted with approximately twice its volume of dioxan and then hydrolyzed and inter-condensed by the slow additions of a 1:3 solution of water in dioxan. After removing the solvent, a hard brittle resinous film was obtained after one hour at 190° C.

Example 9

A solution of $C_6H_5CH_2SiCl_3$ and
$$CH_2=C(CH_3)CH_2SiCl_3$$
in equimolar proportions was diluted with approximately twice its volume of dioxan and then hydrolyzed and inter-condensed by the slow addition of a 1:3 solution of water in dioxan. After removing the solvent, the product set to a tough hard resin at 190° C. in two hours but became brittle in twenty additional hours.

Example 10

To a solution of $(CH_3)Si(OC_2H_5)_3$ and
$$C_{12}H_{25}SiCl_3$$
in the molar proportion 3:1 was added slowly 95% ethyl alcohol to effect hydrolysis and inter-condensation. Water was then added in slight excess. After boiling off the solvents, the concentrated product set in less than one-half hour at 190° C. to a rubbery but crumbly resinous solid.

Example 11

A solution of $C_6H_5CH_2SiCl_3$ and
$$C_6H_5CH_2CH_2SiCl_3$$
in equimolar proportions was diluted with approximately twice its volume of dioxan and then hydrolyzed and inter-condensed by the slow addition of a 1:3 solution of water in dioxan. After removing the solvent, the product yielded a hard thermoplastic resinous film in three hours at 190° C. which became a hard and brittle thermosetting resin in twenty hours.

Example 12

To a mixture of 17.8 grams (.1 mole) of methyltriethoxysilane and 38.5 grams (.2 mole) of ethyltriethoxysilane was added dropwise 20 grams of 0.5% hydrochloric acid. The mixture was heated at 60° C. for 15 minutes, during which time it separated into two liquid phases, a lower copolymer layer and an upper aqueous layer. The two layers were separated and the copolymer portion dissolved in twice its volume of ether. A volume of concentrated hydrochloric acid equal to ⅓ that of the ether was added to the ether solution. The mixture was shaken vigorously. Since the viscosity of the solution was apparently increasing rapidly, the solution was quickly washed free of acid. The ether was removed under reduced pressure leaving an extremely viscous tacky and stringy liquid. A weighed portion was heated in an aluminum dish at 190° C. for one-half hour. It was still fluid at that temperature but when cooled to room temperature was a tack-free resin. It had lost 7% in weight. The same portion was heated another three hours at 190° C. It became a hard transparent solid at that temperature. The total weight loss for the 3½ hour heating at 190° C. was 11.6%. Another portion of the viscous product was heated in a deep tube (to reduce exposure to air) for three hours and 20 minutes. It was no longer fluid at that temperature. The product performed well as a laminating varnish.

It will be seen that the intercondensates produced by my method are not mixtures of individual organosiloxanes but are new compounds differing therefrom in homogeneity of structure and properties. It will further be seen that the individual silicon atoms may differ in the kind of radical attached thereto in which respect the new siloxanes differ from previous siloxanes where each silicon atom was attached to the same kind of radical. Such differences result in new compounds or inter-condensates which embody various improvements over previous mono-organo-siloxanes.

In all organo-silicon compounds the thermal stability of the carbon-silicon linkage varies with the kind of radical. It is necessary to take this into account when considering uses for organo-siloxanes. In general, there is a decrease in thermal stability with increase in size of aliphatic radicals. This is clearly shown by comparison of the thermal behavior of organo-siloxanes containing methyl radicals with those containing dodecyl radicals. The compositions containing allyl, methallyl, benzyl and β-phenylethyl radicals, are relatively less stable than compositions containing such radicals as phenyl, methyl, ethyl, etc. Therefore, certain temperature limitations are encountered in their uses.

The products of my invention which are thermoplastic and thermosetting are useful as molding compounds, film forming coatings, varnishes, impregnating agents for electrical insulation and the like. They may be applied as solutions of the incompletely condensed organo-siloxanes and after evaporation of the solvent can be further polymerized in situ. The more brittle products are useful embedding media for condenser plates as well as molding compounds. Such products may be thermoset in situ by heat.

Certain portions of the subject matter disclosed but not claimed in the present application are claimed in my copending application, Serial Number 648,814, filed February 19, 1946.

I claim:

1. A copolymeric organo-siloxane comprising organo-silicon units which correspond to the formulae $CH_3SiO_{3/2}$ and $RSiO_{3/2}$ respectively, where R is an alkyl radical having from twelve to eighteen carbon atoms, said units being joined together by the oxygen atoms of said units.

2. A copolymeric organo-siloxane comprising organo-silicon units which correspond to the formulae $CH_3SiO_{3/2}$ and $(C_{12}H_{25})SiO_{3/2}$ respectively, said units being joined together by the oxygen atoms of said units.

JAMES FRANKLIN HYDE.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,258,222 | Rochow | Oct. 7, 1941 |

OTHER REFERENCES

Meads, Tr. J. Chem. Soc. (London), vol. 105, 1914, pages 679 and 680.

Meads, J. Chem. Soc., London, vol. 107, 1915, page 459.

Andrianov: J. Gen. Chem. U.S.S.R., vol. 8, 1938, pp. 1255 to 1263.